United States Patent
Rodway et al.

(10) Patent No.: US 10,871,147 B2
(45) Date of Patent: Dec. 22, 2020

(54) WIND TURBINE APPARATUSES

(71) Applicant: Spinetic Energy Limited, Wiltshire (GB)

(72) Inventors: Giles Rodway, Wiltshire (GB); Kurt Joachim, Wiltshire (GB)

(73) Assignee: Spinetic Energy Limited, Wiltshire (GB)

( * ) Notice: Subject to any disclaimer, the term of this patent is extended or adjusted under 35 U.S.C. 154(b) by 246 days.

(21) Appl. No.: 16/061,255

(22) PCT Filed: Nov. 30, 2016

(86) PCT No.: PCT/GB2016/053750
§ 371 (c)(1),
(2) Date: Jun. 11, 2018

(87) PCT Pub. No.: WO2017/098212
PCT Pub. Date: Jun. 15, 2017

(65) Prior Publication Data
US 2020/0173419 A1    Jun. 4, 2020

(30) Foreign Application Priority Data
Dec. 12, 2015    (GB) .................... 1521927.2

(51) Int. Cl.
| | |
|---|---|
| F03D 9/25 | (2016.01) |
| F03D 15/00 | (2016.01) |
| F03D 3/02 | (2006.01) |
| F03D 3/06 | (2006.01) |
| H02K 7/18 | (2006.01) |

(52) U.S. Cl.
CPC .............. *F03D 9/25* (2016.05); *F03D 3/02* (2013.01); *F03D 3/064* (2013.01); *F03D 15/00* (2016.05); *H02K 7/183* (2013.01); *F05B 2220/7066* (2013.01); *F05B 2220/7068* (2013.01); *F05B 2260/30* (2013.01)

(58) Field of Classification Search
CPC ....................................................... F03D 9/25
USPC ..................................................... 290/44, 55
See application file for complete search history.

(56) References Cited

U.S. PATENT DOCUMENTS

| | | | | |
|---|---|---|---|---|
| 3,556,229 A | * | 1/1971 | Hawkins ................ | A01B 35/20 |
| | | | | 172/720 |
| 8,013,464 B2 | * | 9/2011 | Stern ....................... | F03D 3/005 |
| | | | | 290/44 |

(Continued)

FOREIGN PATENT DOCUMENTS

| | | |
|---|---|---|
| CN | 101539103 A | 9/2009 |
| CN | 103032269 A | 4/2013 |

(Continued)

OTHER PUBLICATIONS

Office Action for Chilean Application No. 201801540 dated Jun. 10, 2019.

(Continued)

*Primary Examiner* — Pedro J Cuevas
(74) *Attorney, Agent, or Firm* — Honigman LLP

(57) ABSTRACT

A wind turbine apparatus including: a blade portion; a generator having a stator having a plurality of coils and a rotor having a plurality of magnets, the rotor being connected to the blade portion such that rotation of the blade portion and rotor generates a current within the coils.

15 Claims, 12 Drawing Sheets

(56) References Cited

U.S. PATENT DOCUMENTS

| | | | | |
|---|---|---|---|---|
| 8,188,613 | B2* | 5/2012 | Lee | B60K 7/00 |
| | | | | 290/54 |
| 8,400,008 | B2 | 3/2013 | Gyorgyi | |
| 8,487,470 | B2* | 7/2013 | Grassman | F03D 3/005 |
| | | | | 290/55 |
| 8,541,897 | B2* | 9/2013 | Khoshnevis | F03D 13/20 |
| | | | | 290/44 |
| 8,912,679 | B2* | 12/2014 | Rodway | F03D 3/02 |
| | | | | 290/55 |
| 9,041,239 | B2* | 5/2015 | Epstein | F03D 9/25 |
| | | | | 290/55 |
| 9,328,717 | B1* | 5/2016 | Walker | F03D 3/005 |
| 9,657,713 | B2* | 5/2017 | Shirakawa | F16C 19/181 |
| 9,797,447 | B2* | 10/2017 | Aso | F03D 3/005 |
| 2008/0309090 | A1* | 12/2008 | Stern | F03D 3/005 |
| | | | | 290/55 |
| 2009/0140528 | A1* | 6/2009 | Ireland | F03D 3/065 |
| | | | | 290/55 |
| 2010/0295316 | A1 | 11/2010 | Grassman | |
| 2011/0012361 | A1* | 1/2011 | Lee | B60K 7/00 |
| | | | | 290/55 |
| 2011/0089698 | A1* | 4/2011 | Ahmadi | F03D 9/007 |
| | | | | 290/55 |
| 2011/0248510 | A1* | 10/2011 | Yan | F03D 3/005 |
| | | | | 290/55 |
| 2011/0304150 | A1* | 12/2011 | Hara | F03D 3/064 |
| | | | | 290/55 |
| 2012/0146338 | A1* | 6/2012 | Teglia | H02K 7/183 |
| | | | | 290/55 |
| 2012/0326447 | A1* | 12/2012 | Rodway | F03D 3/02 |
| | | | | 290/55 |
| 2014/0077504 | A1* | 3/2014 | Epstein | F03D 80/70 |
| | | | | 290/55 |
| 2014/0306459 | A1* | 10/2014 | Aso | F03D 3/005 |
| | | | | 290/55 |
| 2015/0098797 | A1* | 4/2015 | Shirakawa | F03D 3/062 |
| | | | | 415/111 |
| 2015/0159628 | A1 | 6/2015 | Appa | |
| 2019/0360465 | A1* | 11/2019 | Moore | H02K 21/026 |

FOREIGN PATENT DOCUMENTS

| | | |
|---|---|---|
| CN | 203130369 U | 8/2013 |
| CN | 104265571 A | 1/2015 |
| CN | 104379924 A | 2/2015 |
| CN | 104632528 A | 5/2015 |
| DE | 4005685 A1 | 12/1991 |
| DE | 4006256 A1 | 2/1992 |
| DE | 4007017 A1 | 5/1992 |
| EP | 0793329 A1 | 9/1997 |
| FR | 2295257 A1 | 7/1976 |
| GB | 2461285 A | 12/2009 |
| GB | 2476126 A | 6/2011 |
| JP | 2002310057 A | 10/2002 |
| JP | 2008106732 A | 5/2008 |
| WO | WO-2005095794 A1 | 10/2005 |
| WO | 2011101650 A2 | 8/2011 |

OTHER PUBLICATIONS

English translation of Office Action for Japanese Application No. 2018-529106 dated Jun. 18, 2019.
Bibliographic reference to Chilean Publication No. 201100542 dated Sep. 9, 2011.
Bibliographic reference to Chilean Publication No. 2008003251 dated Aug. 7, 2009.
Japanese Publication No. H7-35810 dated Jul. 4, 1995.
Combined Search and Examination Report for Application No. GB1701202.2 dated May 23, 2017.
Search and Examination Report for Application No. GB1521927.2 dated Sep. 30, 2016.
Combined Search and Examination Report for Application No. GB1521927.2 dated Feb. 23, 2016.
International Search Report for Application No. PCT/GB2016/053750 dated Jun. 19, 2017.

* cited by examiner

WIND TURBINE APPARATUSES

TECHNICAL FIELD

The invention generally relates wind turbine apparatuses and more particularly relates to wind turbine apparatuses having a plurality of turbine modules.

BACKGROUND

It is known to arrange a plurality of vertical axis wind turbine (VAWT) modules within a frame to form a wind fence; see UK Patent No. 2476126, for example. Such an arrangement is shown in FIG. 1. As shown, the frame 1 is formed by upper and lower structural rails 3a, 3b and left and right side members 5a, 5b to form a rectangular frame. A plurality (four are shown) of wind turbine modules 7a-7d are located within the frame 1 and are spaced from one another along the width of the frame 1. The modules 7a-7d are affixed at either end to the upper and lower structural rails 3a, 3b. Each module 7a-7d comprises a blade portion 9 and a generator 11 coupled thereto.

FIGS. 2 and 3 show an exemplary axial-flux generator 11 in further detail. As shown, the generator 11 comprises a rotor 13 and a stator 15. The rotor 13 is formed by an outer housing of the generator 11 which is connected to the blade portion 9 for rotation therewith. In contrast, the stator 15 is formed by a shaft 17 which is affixed to the lower rail 3b. The rotor 13 is rotatably mounted to the shaft 17 by upper and lower bearings 21a, 21b. The shaft 17 carries a disc 19 which has a plurality of coils 23 arranged in a circle. The rotor 13 carries a plurality of permanent magnets 25. The permanent magnets 25 are arranged in an upper circle and a lower circle which correspond with the circle of coils 23. The coils 23 are sandwiched between the upper and lower sets of magnets 25 with a small gap therebetween to allow free movement of the magnets 25 relative to the coils 23.

Rotation of the blade portion 9 in response to the force of wind causes rotation of the rotor 13. The movement of the magnets 25 relative to the coils 23 induces a current in the coils 23 which can be harnessed as useful electricity.

As described above, the rotor 13 is supported by a pair of bearings 21a, 21b which maintain alignment between the rotor 13 and the stator 15 such that the distance between the coils 23 and magnets 25 can be minimized, thereby improving efficiency. While such an arrangement addresses axial misalignment issues between the rotor 13 and stator 15, in order for the blade portion 9 and rotor 13 to rotate freely, the center of the bearing supporting the upper end of the blade portion 9 (at the upper rail 3a) must lie on the axis defined by the centers of the two bearings 21a, 21b within the generator 11. With this arrangement, sufficient alignment must be achieved in manufacture/assembly, and in all weather conditions during operation, to avoid the risk that at least some of these bearings bind, thus reducing system power output, and potentially causing excessive bearing wear or overheating. Achieving and maintaining such alignment is likely to lead to an excessive requirement for frame rigidity, blade stiffness, and/or a substantial common central shaft running the full height of the module, all with significant associated cost and weight penalties.

A flexible coupling between the blade portion 9 and the rotor 13 may be introduced to allow the rotation axis of the blade portion 9 to deviate slightly from that of the generator 11 without damaging either component. Such an arrangement can, however, create a new issue in that a high torque (perpendicular to the rotation axis) is generated on the lower rail 3b which supports the generator 11.

Moreover, in order to carry the generated current away from the coils 23, it is necessary for the shaft 17 to be hollow so that suitable wiring can pass through the shaft 17. However, as described, the shaft 17 carries the weight of the generator 11 and must withstand in-service loads. As a result, such shafts are conventionally constructed from relatively high strength steel so as to give them the necessary strength and rigidity.

It is desirable to provide improved arrangements which address some or all of the issues associated with the prior art arrangements described above.

SUMMARY

In accordance with an aspect of the invention, there is provided a wind turbine apparatus comprising: a blade portion; a generator comprising a stator having a plurality of coils and a rotor having a plurality of magnets, the rotor being connected to the blade portion such that rotation of the blade portion and rotor generates a current within the coils; wherein the blade portion is connected to the rotor by a yoke which extends around the generator and is connected to the base of the rotor such that the magnets of the rotor and the coils of the stator are disposed between the blade portion and the connection between the yoke and the rotor.

The stator may comprise a shaft which is received by a supporting rail.

The connection between the yoke and the rotor may be disposed between the supporting rail and the magnets and coils.

The rotor may be rotatably mounted on the stator by a bearing, and the connection between the yoke and the rotor may be formed around the bearing.

The yoke may be compliant so as to allow the rotation axes of the blade portion and the rotor to be offset from one another.

The yoke may be connected to the blade portion and/or the rotor via a compliant coupling so as to allow the rotation axes of the blade portion and the rotor to be offset from one another.

The yoke may be connected to the blade portion and/or the generator via a quick-release mechanism.

In accordance with another aspect of the invention, there is provided a wind turbine apparatus comprising: a blade portion; a generator comprising a stator having a plurality of coils and a rotor having a plurality of magnets, the rotor being connected to the blade portion such that rotation of the blade portion and the rotor generates a current within the coils; wherein the stator comprises a shaft, the shaft having a first terminal portion and a second terminal portion separated from one another by an insulator, the first and second terminal portions being electrically connected to the coils; wherein the shaft is received by openings provided in first and second conductive rails so as to support the generator and blade portion and such that the first and second terminal portions are electrically coupled to the first and second conductive rails respectively to carry the current from the coils.

The holes in the first and second conductive rails may have complementary cross-sections to the first and second terminal portions.

The first terminal portion may be formed by a pin and the second terminal portion may be formed by a sleeve which surrounds the pin. The pin may project from the sleeve such that the pin is received by the second conductive rail when the sleeve is received by the first conductive rail.

The pin and sleeve may be concentric.

The sleeve may have a first diameter and the pin may have a second diameter which is smaller than the first diameter. The openings of the first and second rails may be sized to receive the first and second diameters respectively.

The first and/or second rail may be provided with a retention member having or defining a hole sized to receive the first or second terminal portion. The retention member may be configured to be aligned with the rail so that the terminal portion is received by the hole of the retention member and the opening in the rail and wherein the retention member is translatable relative to the rail so as to draw the terminal portion against the rail, thereby mechanically connecting the stator to the rail.

The first and/or second rails may be tubular defining a cavity which extends therethrough and the retention member may be received within the cavity.

An exterior profile of the retention member may be sized and/or shaped to ensure alignment of the hole of the retention member and the opening in the rail.

The exterior profile of the retention member may substantially correspond to (although may fit fairly loosely within) an interior profile of the cavity.

The retention member may be secured to the rail by a threaded fastener which translates the retention member relative to the rail as it is rotated.

The blade portion and the generator may form a turbine module and the apparatus may comprise a plurality of said modules.

BRIEF DESCRIPTION OF THE DRAWINGS

For a better understanding of the invention, and to show more clearly how it may be carried into effect, reference will now be made, by way of example, to the accompanying drawings, in which:—

DETAILED DESCRIPTION

Figure 1:
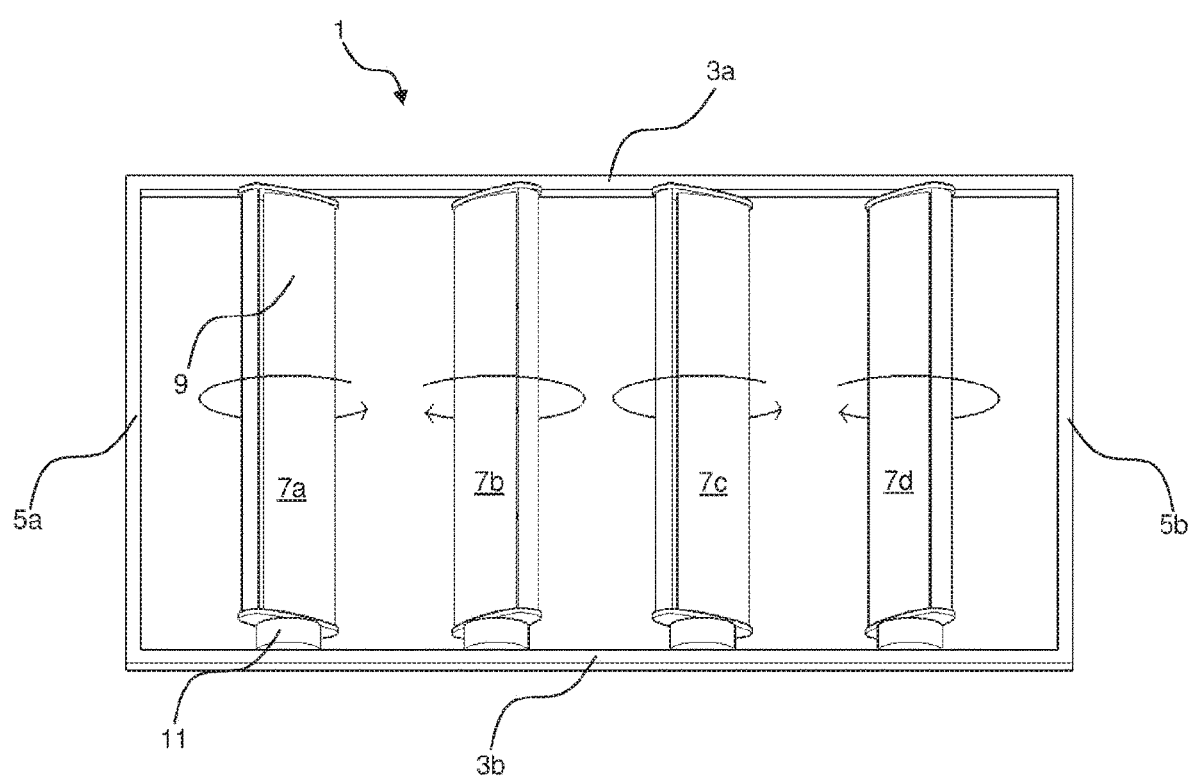
FIG. 1 is a front view of a prior art wind fence.
Figure 2:
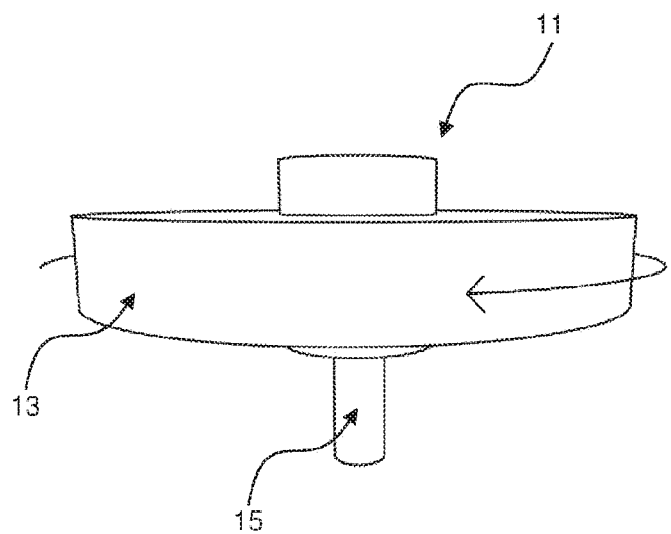
FIG. 2 is a front view of a prior art generator.
Figure 3:
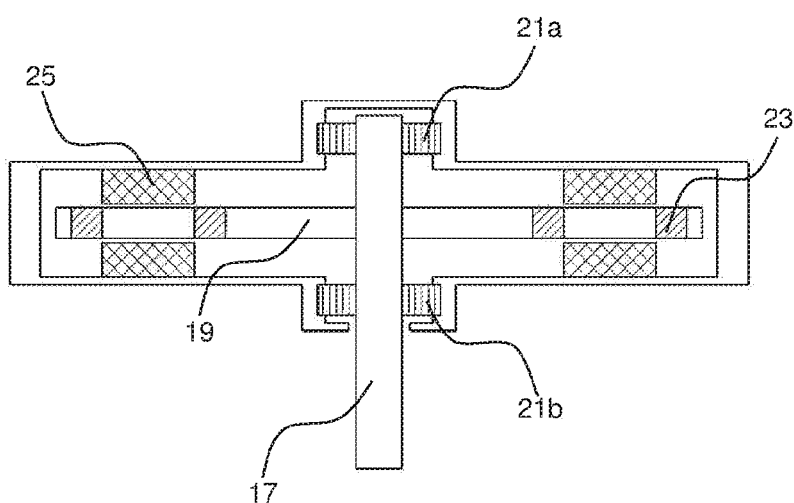
FIG. 3 is a cross-sectional view of the generator of FIG. 2.
Figure 4:
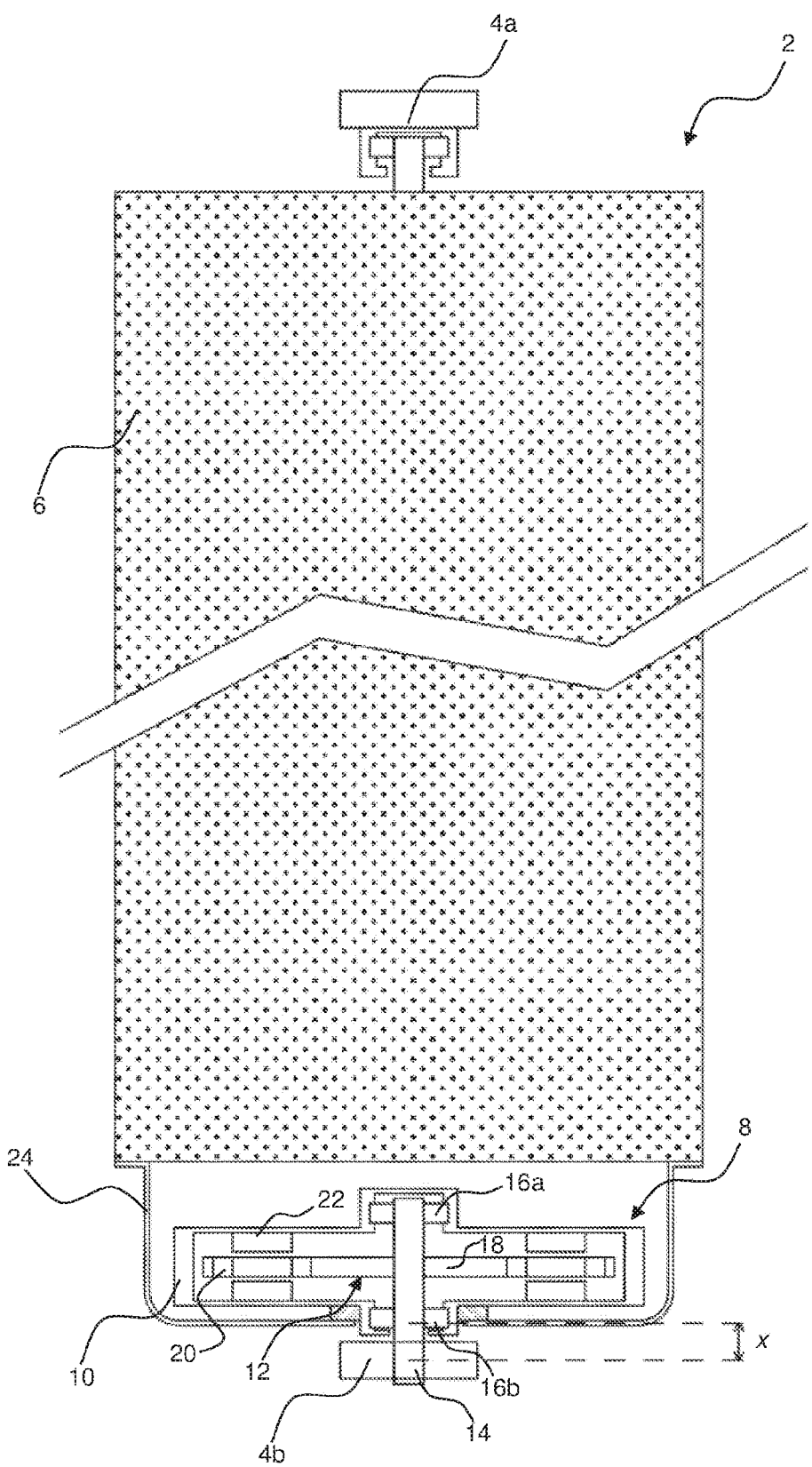
FIG. 4 is a cross-sectional view of a wind turbine module according to an embodiment of the invention.

FIG. 4 shows a wind turbine module 2 according to an embodiment of the invention. The module 2 may be one of a plurality of similar modules arranged in a frame comprising an upper rail 4a and a lower rail 4b, in a similar manner to that shown in FIG. 1.

The module 2 is connected at its upper end to the upper rail 4a and at its lower end to the lower rail 4b. The module 2 comprises a blade portion 6 and a generator 8. The generator 8 is an axial-flux generator which comprises a rotor 10 and a stator 12. The rotor 10 is formed by an outer housing of the generator 8 which is connected to the blade portion 6 for rotation therewith. In contrast, the stator 12 is formed by a shaft 14 which is affixed to the lower rail 4b. The rotor 10 is rotatably mounted to the shaft 14 by upper and lower bearings 16a, 16b. The shaft 14 carries a disc 18 which has a plurality of coils 20 arranged in a circle. The rotor 10 carries a plurality of permanent magnets 22. The permanent magnets 22 are arranged in an upper circle and a lower circle which correspond with the circle of coils 20. The coils 20 are sandwiched between the upper and lower sets of the magnets 22 with a small gap therebetween to allow free movement of the magnets 22 relative to the coils 20.

The blade portion 6 is connected to the rotor 10 by a yoke 24 which extends from the blade portion 6 to a lower side of the rotor 10. Specifically, the yoke 24 connects to the rotor 10 around the lower bearing 16b. The yoke 24 thus connects to the rotor 10 below the disc 18 of the stator 12 and its coils 20 and below the magnets 22 of the rotor 10 itself.

In contrast to prior art arrangements where the blade portion is connected directly to the rotor (i.e. either rigidly or flexibly to the top of the rotor), the yoke 24 allows the connection to the rotor 10 to be placed lower down, closer to the lower rail 4b. The distance x between the coupling point and the neutral axis of the rail 4b in thus minimized. This reduces the levering effect of the wind loading on the rail 4b, via the rotor 10 or shaft 14, and thus minimizes misalignment between the axes of rotation of the blade portion 6 and the rotor 10 for a given wind loading.

Figure 5:
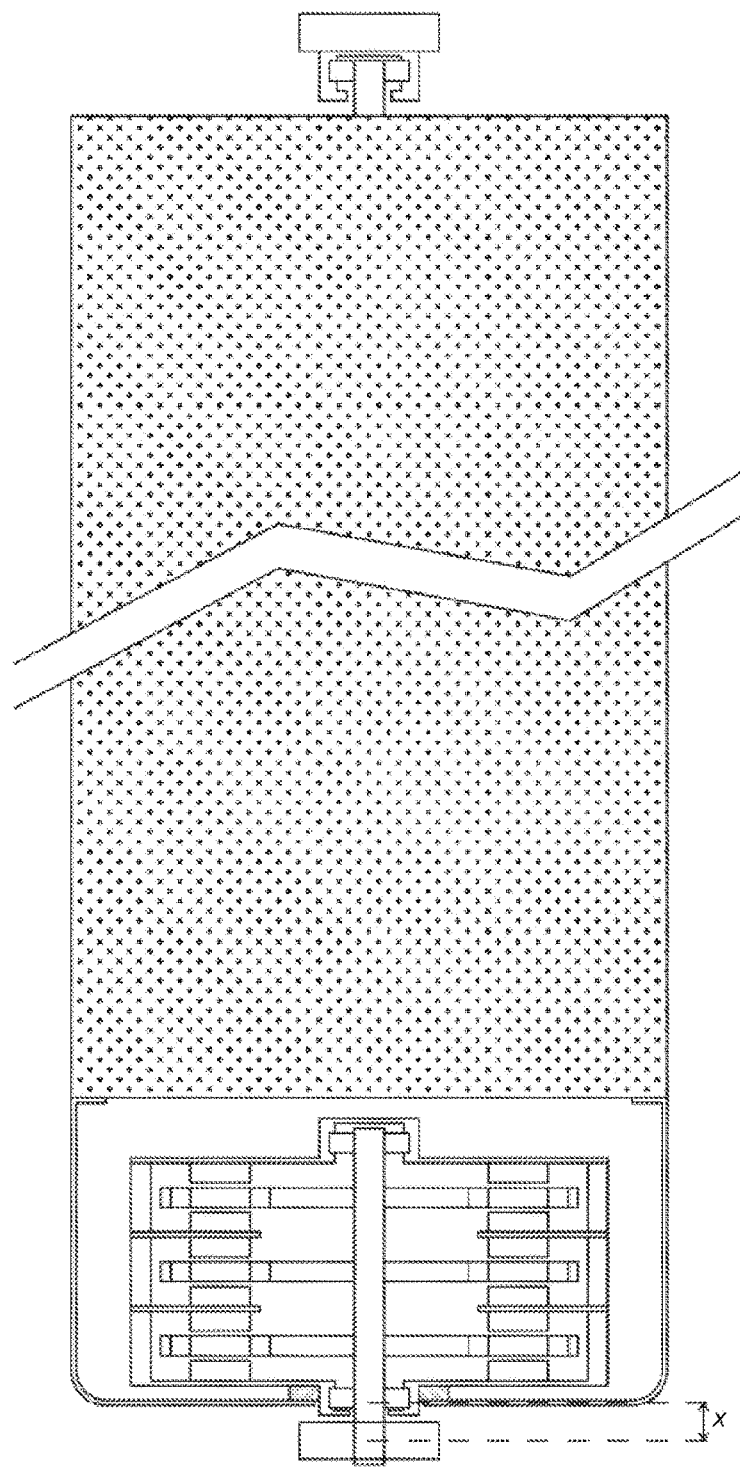
FIG. 5 is a cross-sectional view of a wind turbine module according to another embodiment of the invention.

Further, as shown in FIG. 5, the height of the generator 8 has no effect on the distance x such that stacked stator configurations can be used without increasing the levering effect.

It will be appreciated that the structure of the yoke 24 may take various forms, provided that it places the coupling point below the disc 18 of the stator 12 and its coils 20 and below the magnets 22 of the rotor 10 itself. However, FIGS. 6 and 7 show an exemplary yoke 24.

Figure 6:
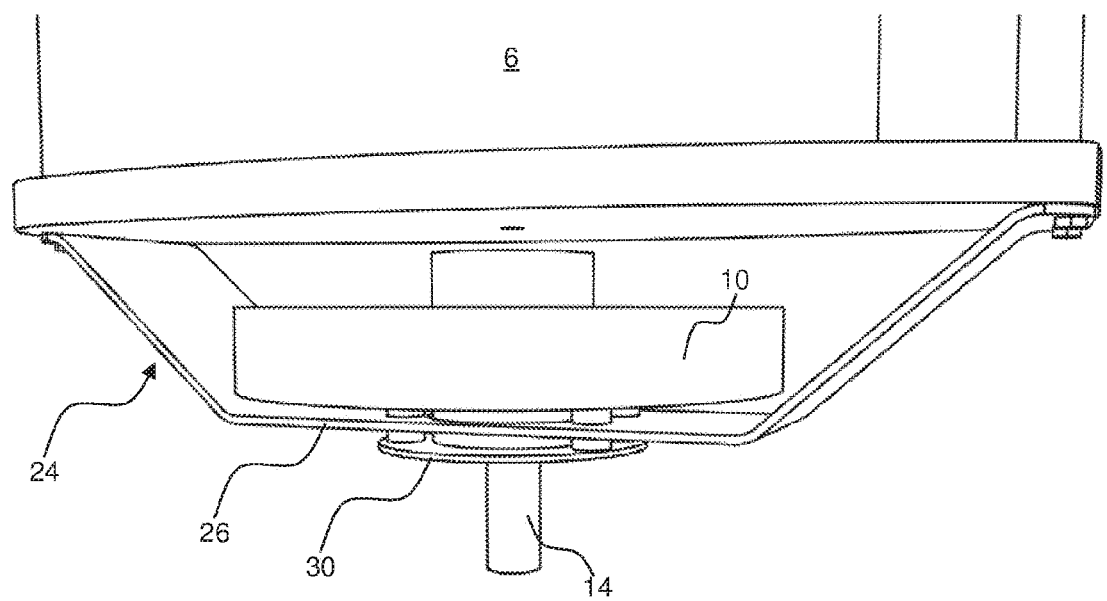
FIG. 6 is a perspective view of the wind turbine module of FIG. 4 showing a yoke arrangement.
Figure 7:
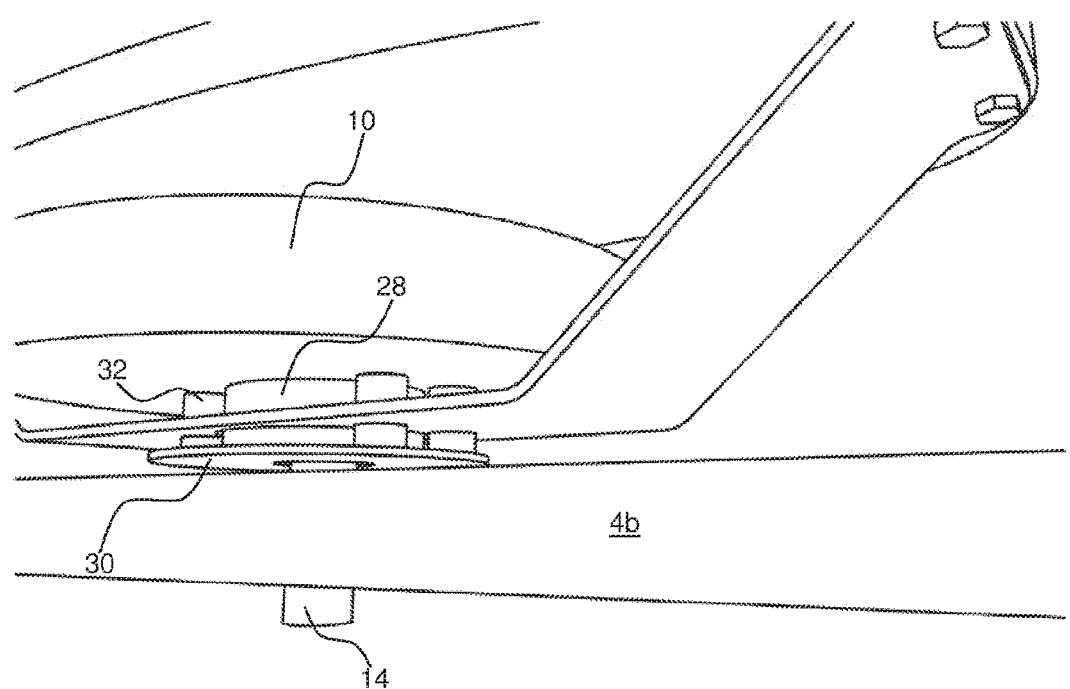
FIG. 7 is a perspective view of the wind turbine module of FIG. 4 following engagement with a lower rail.
Figure 8:
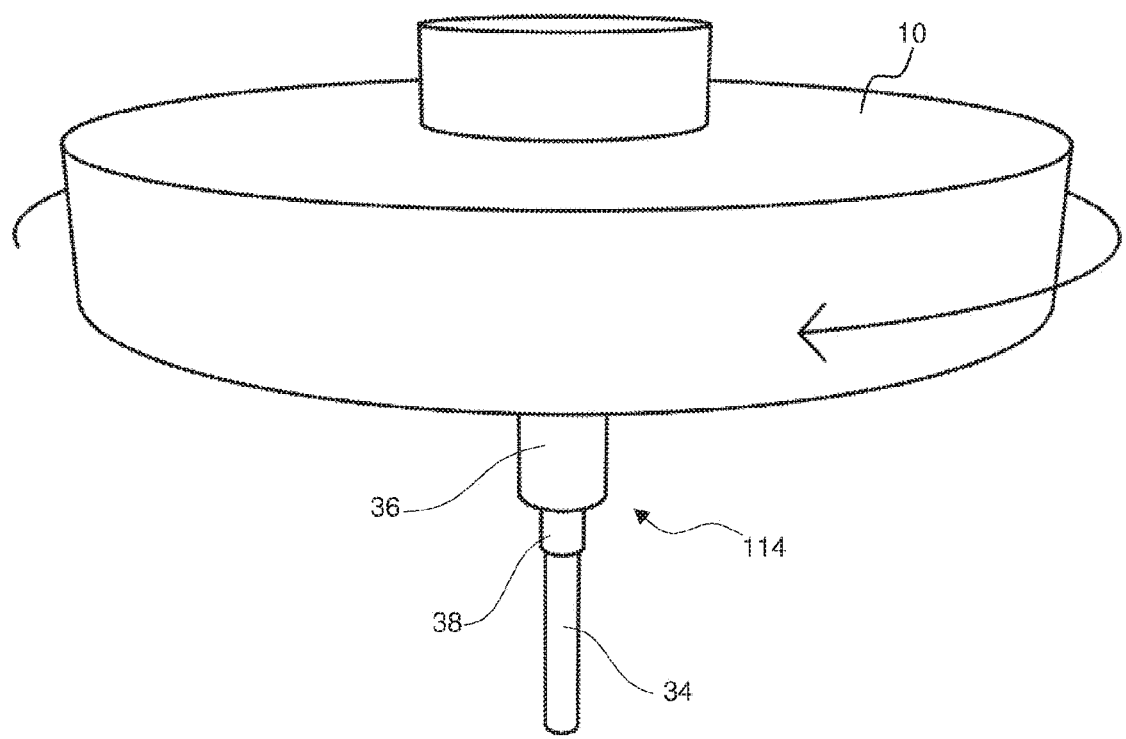
FIG. 8 is a perspective view of a generator according to an embodiment of the invention.
Figure 9:
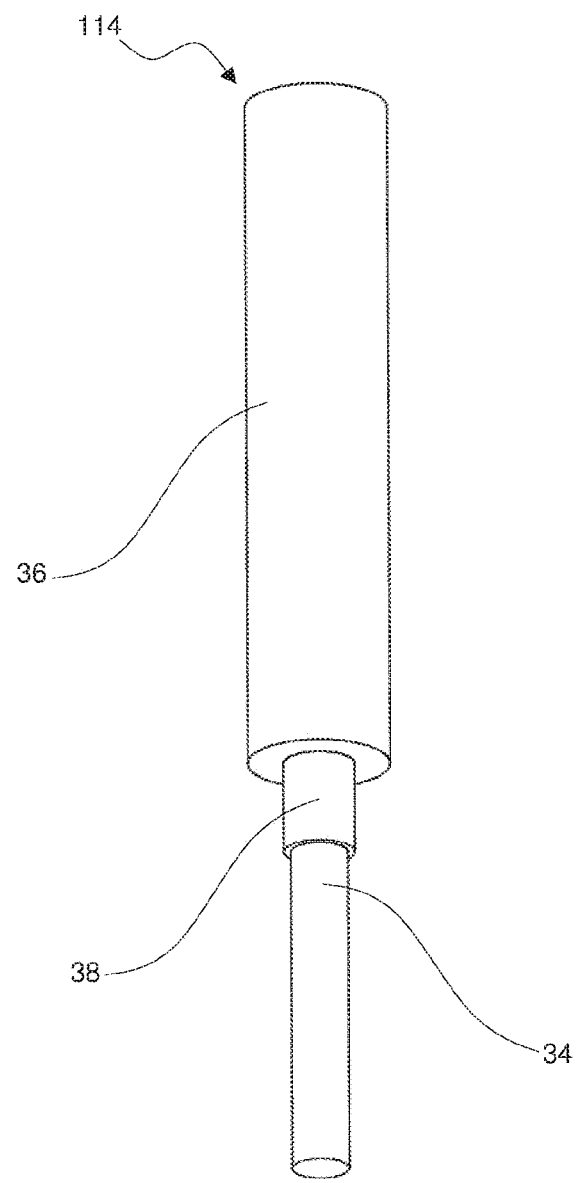
FIG. 9 is a perspective view of a shaft of the generator.

As shown in FIGS. 6 and 7, the yoke 24 is formed as a metal band which is connected at either end to the base of the blade portion 6 such that it extends across the span (i.e. the width of the blade portion 6 when aligned with the frame) of the blade portion 6. Between each end, the band is bent away from the blade portion 6 to form a central section 26. The central section 26 is spaced from the blade portion 6 by a distance which is sufficient to receive the generator 8. The central section 26 comprises a hole which is received about a hub 28 formed at the base of the outer housing of the rotor 10. The diameter of the hole in the central section 26 of the yoke 24 is slightly larger than the external diameter of the hub 28 such that it fits loosely around the hub 28. The central section 26 is retained on the hub 28 by a lower collar 30 which is connected to the distal end of the hub 28. A plurality of elastomeric washers 32 are disposed on the upper and lower sides of the central section 26 between the central section 26 and a lower radial surface of the rotor 10 and between the central section 26 and the collar 30. The elastomeric washers 32 provide a compliant coupling between the blade portion 6 and the rotor 10 allow their orientations to vary under wind loading. A similar compliance may also be provided using other forms of flexible mounting, such as o-rings, springs, flexible struts or pillars. The yoke 24 may also be formed from flexible materials (e.g. polymers, glass reinforced composites, or aluminum or sheet steel) and/or articulated joints may be provided within the yoke 24 itself to provide compliance.

The yoke 24 may be detachable from the blade portion 6 and/or the rotor 10 using conventional bolts or quick release catches. This may allow the blade portion 6 and/or generator 8 to be removed easily for maintenance or replacement. Alternatively, the entire module 2 may be removable using suitable brackets which attach to the frame.

As an illustration, an axial flux generator, constructed to match the output of a turbine with a swept area of ~0.75 m2, was mounted in a frame consisting of rectangular cross-section aluminum tubing, of cross-sectional outer dimensions 50 mm×25 mm. The top of the generator had a height of ~65 mm above the neutral axis of the frame member, which thus corresponded to the minimum distance for a conventional coupling arrangement. In contrast, by using the yoke 24 described previously, the blade portion 6 can be attached between the generator and the lower rail 4b, at a distance of ~9 mm from the surface of the beam, or <22 mm from its neutral axis, corresponding to a reduction in torque (and hence tendency to twist) on the box-section frame member, of approximately 66%.

An embodiment of the shaft will now be described with reference to FIGS. 8 to 13. The shaft 114 shown therein may be used with the yoke arrangement described previously or may be used with conventional modules.

Figure 10:
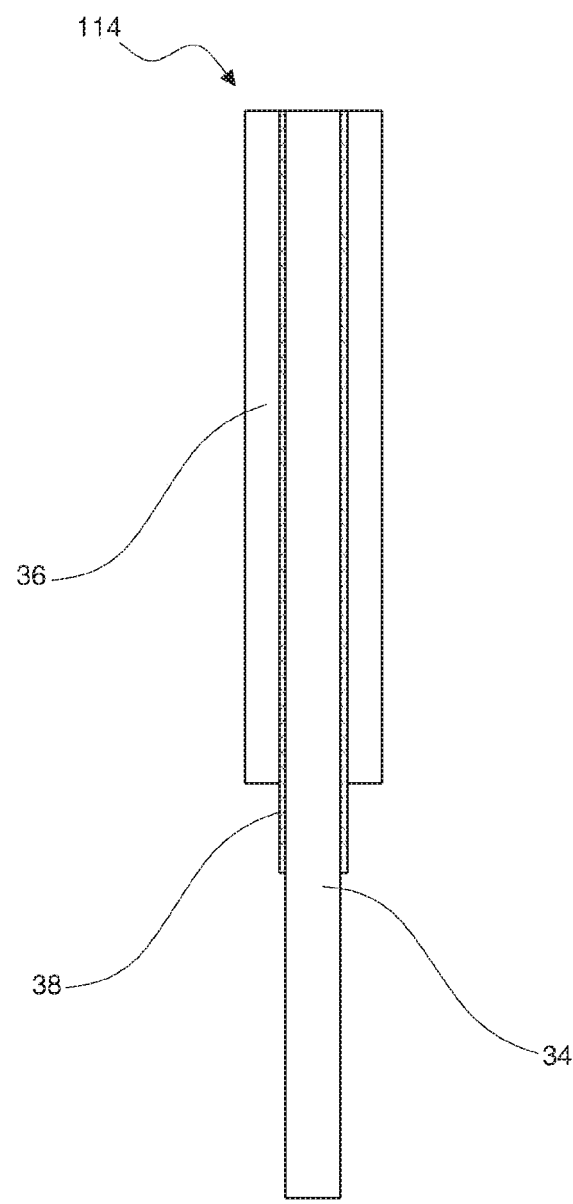
FIG. 10 is a cross-sectional view of the shaft.

The shaft 114 comprises a central pin or rod 34 and an outer sleeve 36 within which the central pin 34 is disposed (see FIG. 10).

The central pin 34 is cylindrical and substantially solid along its length. The outer sleeve 36 is tubular and has an internal diameter which is sized to receive the central pin 34 such that the central pin 34 and outer sleeve 36 are arranged concentrically. As shown, the central pin 34 has a greater axial length than the outer sleeve 36 such that a portion of the central pin 34 extends out of the outer sleeve 36. Both the central pin 34 and outer sleeve 36 (or at least a part thereof) are formed from conductive metals. For example, a medium/high strength aluminum alloy may be used, but other shaft materials including, but not limited to, copper, brass or steel may also be used.

Disposed between the central pin 34 and the outer sleeve 36 is an insulating layer 38. The insulating layer 38 may be a discrete tubular element disposed between the central pin 34 and outer sleeve 36 or may be a layer formed on either (or both) of (or between) the central pin 34 and the outer sleeve 36. The insulating layer 38 extends along at least the axial length of the outer sleeve 36 and electrically insulates the central pin 34 from the outer sleeve 36. The insulating layer 38 may be a reinforced thermoplastic or thermoset material, such as a fiber-reinforced epoxy material, with the three components being bonded together, for example using an epoxy adhesive, to form a composite unit.

The central pin 34 and outer sleeve 36 are connected to either end of the coils 20 to form connector terminals. The central pin 34 and outer sleeve 36 may be connected to the coils 20 either directly to provide an AC output or indirectly via a rectifier circuit to provide a DC output. Where a DC output is used, the connector terminals form positive and negative terminals.

Figure 11:
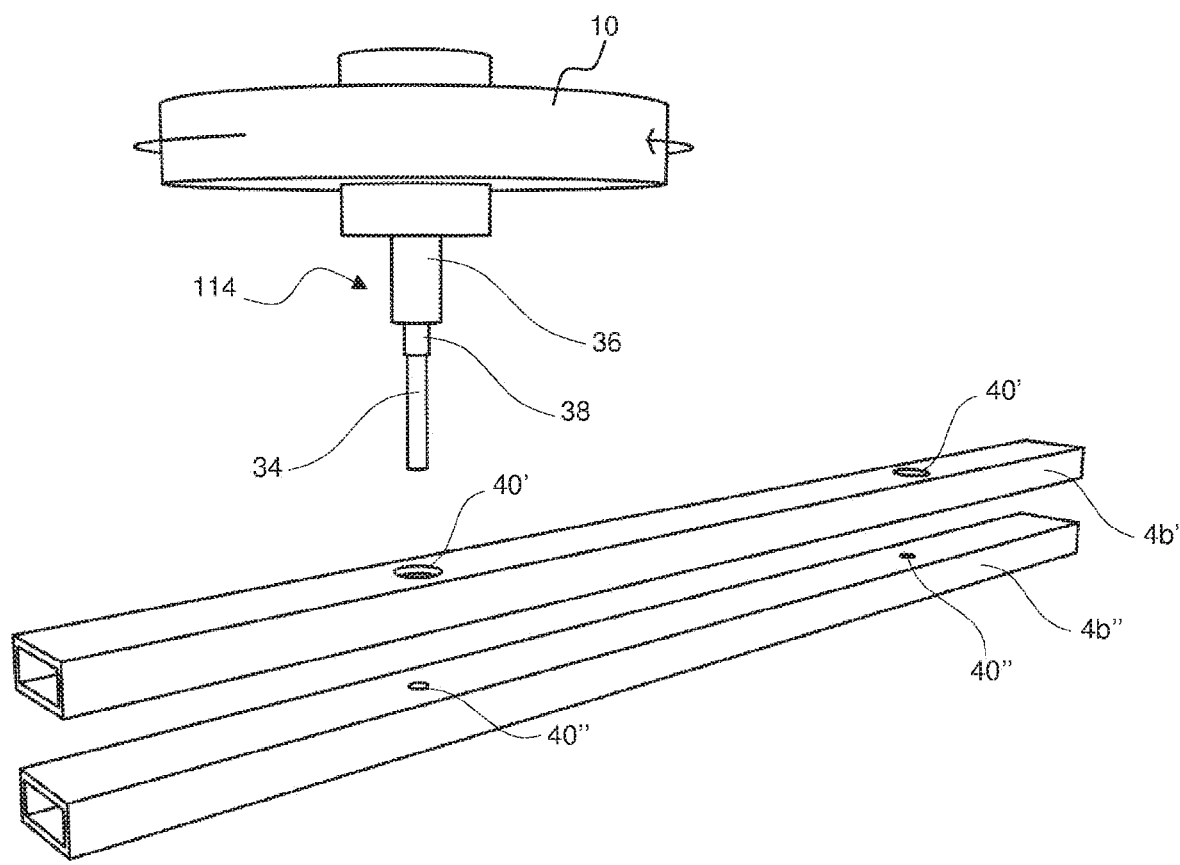
FIG. 11 is a perspective view showing the generator prior to engagement with a pair of conductive rails.

As shown in FIG. 11, the lower rail 4b is divided into a first (upper) lower rail 4b' and a second (lower) rail 4b".

Each rail 4b', 4b" is formed by a hollow electrically conductive, structural box-section beam. The rails 4b', 4b" may be mechanically linked to one another with electrically insulating tie-pieces (not shown).

The first lower rail 4b' is provided with a plurality of holes 40' spaced along its length (two are shown, but any number may be provided to match the number of modules 2). The holes 40' are in fact each formed as a pair of coaxial holes in the upper and lower walls of the beam structure. The holes 40' have an internal diameter which is sized to receive (i.e. is slightly larger than) the outer sleeve 36 of the shaft 114. Similarly, the second rail 4b" is provided with a plurality of holes 40" spaced along its length and sized to receive the central pin 34. The holes 40" of the second rail 4b" thus have a smaller diameter compared to the holes 40'.

Figure 12:
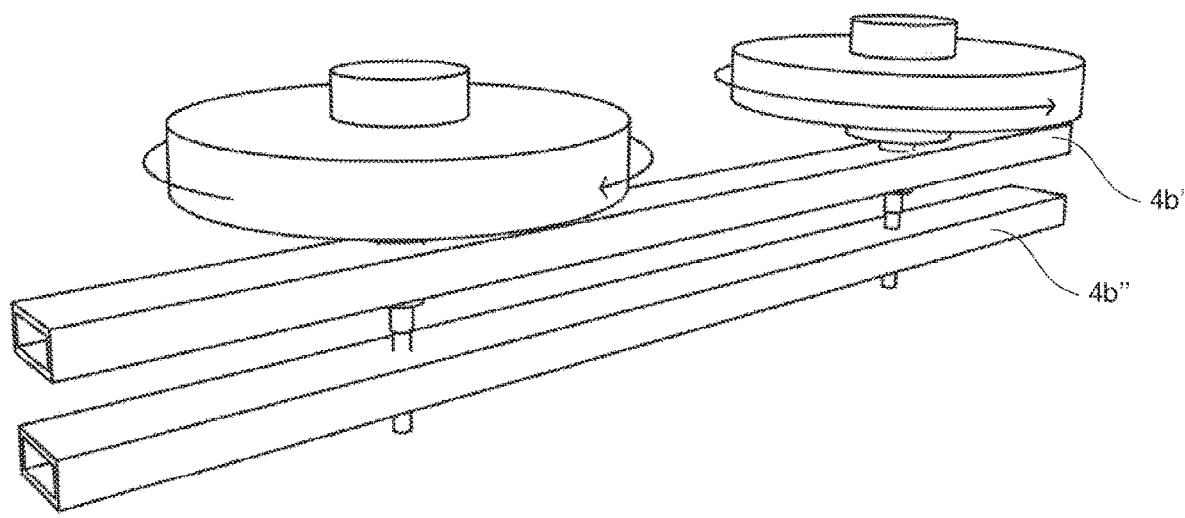
FIG. 12 is a perspective view showing a pair of generators engaged with the conductive rails.

The holes 40' of the first rail 4b' and the holes 40" of the second rail 4b" are coaxial. Therefore, as shown in FIG. 12, when the shaft 114 is received by the lower rails 4b', 4b", the central pin 34 passes through one of the holes 40' in the first rail 4b' and is subsequently received by the corresponding hole 40" in the second rail 4b", at which point the outer sleeve 36 is received by the hole 40' of the first rail 4b'. The outer sleeve 36 contacts the first rail 4b' and the central pin 34 contacts the second rail 4b" to form electrical connections therewith. The first and second rails 4b', 4b" are thus able to carry the current generated in the generator 8 to which the shaft 114 is connected.

As described, the shaft 114 is solid along its length. The shaft 114 is therefore stronger than conventional shafts which must be hollow to allow wires to pass therethrough. The shaft 114 can therefore be manufactured from lighter materials, such as aluminum.

Figure 13:
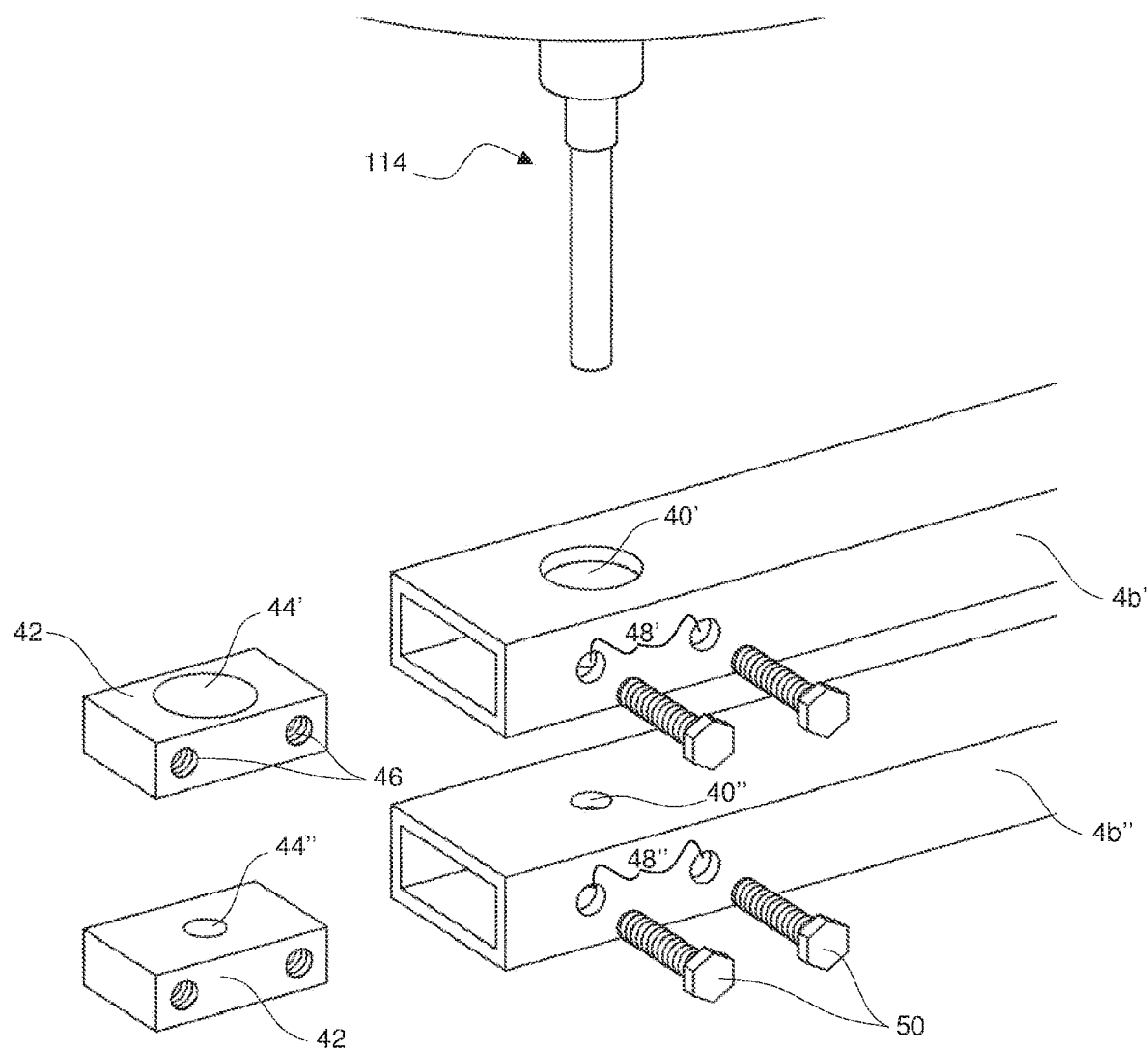
FIG. 13 is an exploded view showing a mechanical connection between the generator and the conductive rails.

FIG. 13 shows an arrangement which may be used to aid the electrical connection and to provide a mechanical connection between the shaft 114 and the rails 4b', 4b". Specifically, as shown, blocks 42 (retention members) may be disposed within the rails 4b' 4b". The blocks 42 have a cross-section which corresponds to that of the rails 4b', 4b" and thus in the present example are cuboid in shape. The blocks 42 are sized slightly smaller than the internal cavity of the rails 4b' 4b" such that they are loose when placed within the cavity.

The blocks 42 are provided with holes 44', 44" which correspond to the holes 40', 40" of the respective rail 4b' 4b". A pair of threaded holes 46 are provided in each of the blocks 42. The threaded holes 46 are provided on the front (or rear) surface of the blocks 42 such that they are perpendicular to the holes 44', 44". Complementary holes 48', 48" are provided in a front surface of the rail 4b', 4b", such that a threaded fastener 50 (a bolt or the like) can be passed through the holes 48', 48" and received by the threaded holes 46 of the blocks 42, with the holes 44', 44" of the blocks 42 aligned with the holes 40', 40" of the rails 4b', 4b". As described previously, the blocks 42 are loose within the rails 4b', 4b" such that the threaded fasteners draw the blocks 42 towards the front surface of the rails 4b', 4b". This action locks the central pin 34 and outer sleeve 36 of the shaft 114 against the rail 4b', 4b" (between one wall of the holes 44', 44" in the blocks 42, and the opposite walls of the holes 40', 40" in the rails 4b', 4b") forming a solid mechanical and electrical connection. The blocks 42 may be electrically conductive to further aid the electrical connections between the shaft 114 and the rails 4b', 4b".

The shaft 114 may be secured using different forms of retention member. For example, a bolt may pass through the walls of the rails 4b', 4b" into a hole in the shaft 114 or simply against the outer surface of the shaft 114.

From an electrical perspective, the structure of the shaft 114 described above, comprising two mutually isolated conductors, would be useful in carrying single phase AC from a suitably designed stator to an external conductive clamping/support mechanism for example of the type described above. Alternatively, the same design of shaft could be used to carry DC, for example from rectifiers within the generator.

Other variants on the above shaft design could be used, for example, to carry 3 phase AC, by the construction of a 5 layer shaft of alternating concentric conductors and insulating layers to a support structure comprising, for example, three electrically conductive rails, one above the other, with corresponding holes to receive the 3 mutually isolated electrically conductive concentric tubes/cylinders of such a shaft.

A plurality of generators may feed DC current or AC current (if suitably synchronized) into the lower rails which act as busbars to convey the electricity.

This frame of the apparatus may be supplied and installed prior to fitting any of the modules 2. The design of the shaft 114 allows such a frame to be populated with wind turbine modules 2 in a very rapid and efficient manner, without any wiring connections whatsoever being made between the generators 8 and any other part of the system, and with no wiring being required within, nor running along, the frame.

The shaft 114 and its constituent elements need not be circular in cross-section. For example, the shaft 114 may have a square cross-section which may prevent rotation of the shaft 114. Further, although the two conductors of the shaft 114 have been described as being located one within the other, it will be appreciated that other arrangements may be used where the conductors (terminal portions) are provided in other positions, but still mutually isolated from one another. For example, the conductors may each have complementary semi-circular cross-sections. Further, the central pin 34 may have the same outer diameter as the outer sleeve 36 over the portion extending below the sleeve 36 (for example, with a ring of insulating material or an air gap between the radial surfaces of the central pin 34 and the sleeve 36). The holes in each of the rails 4b', 4b" may therefore have the same diameter.

Further, although the aspects described previously are particularly beneficial for an apparatus comprising a plurality of wind turbine modules, they may also be used with an apparatus comprising a single turbine.

The above description focuses on axial-flux generators; however, it will be appreciated that the concepts may also be extended to radial-flux generators. Further, the generator need not be provided at the bottom of the module and may instead be at the top of the module or a generator provided at either end. Moreover, the wind turbine module may be arranged such that the blade portion has its axis of rotation oriented horizontally, but perpendicular to the wind direction such that the generator is at either or both sides. Consequently, references to relative positions (e.g. "below" and the like) should be construed accordingly.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention is not limited to the embodiments described herein, and may be modified or adapted without departing from the scope of the present invention.

The invention claimed is:

1. A wind turbine apparatus, comprising:
   a blade portion;
   a generator including a stator having a plurality of coils and a rotor having a plurality of magnets, wherein the rotor is connected to the blade portion such that rotation of the blade portion and rotor generates a current within the coils;
   wherein the blade portion is connected to the rotor by a yoke which extends around the generator and is connected to a base of the rotor such that the magnets of the rotor and the coils of the stator are disposed between the blade portion and the connection between the yoke and the rotor,
   wherein the stator includes a shaft which is received by an elongate supporting rail,
   wherein the connection between the yoke and the rotor is disposed between the elongate supporting rail and the magnets and coils, and
   wherein the yoke is connected to the blade portion and/or the generator by way of a quick-release mechanism.

2. A wind turbine apparatus as claimed in claim 1, wherein the rotor is rotatably mounted on the stator by a bearing, wherein the connection between the yoke and the rotor is formed around the bearing.

3. A wind turbine apparatus as claimed in claim 1, wherein the yoke is compliant so as to allow the rotation axes of the blade portion and the rotor to be offset from one another.

4. A wind turbine apparatus as claimed in claim 1, wherein the yoke is connected to the blade portion and/or the rotor via a compliant coupling so as to allow the rotation axes of the blade portion and the rotor to be offset from one another.

5. A wind turbine apparatus, comprising:
   a blade portion;
   a generator including a stator having a plurality of coils and a rotor having a plurality of magnets, the rotor being connected to the blade portion such that rotation of the blade portion and the rotor generates a current within the coils;
   wherein the stator includes a shaft, the shaft having a first terminal portion and a second terminal portion separated from one another by an insulator, the first and second terminal portions being electrically connected to the coils;
   wherein the shaft is received by openings provided in first and second conductive rails so as to support the generator and blade portion and such that the first and second terminal portions are electrically coupled to the first and second conductive rails respectively to carry the current from the coils.

6. A wind turbine apparatus as claimed in claim 5, wherein the openings in the first and second conductive rails have complementary cross-sections to the first and second terminal portions.

7. A wind turbine apparatus as claimed in claim 5, wherein the first terminal portion is formed by a pin and the second terminal portion is formed by a sleeve which surrounds the pin; wherein the pin projects from the sleeve such that the pin is received by the second conductive rail when the sleeve is received by the first conductive rail.

8. A wind turbine apparatus as claimed in claim 7, wherein the pin and sleeve are concentric.

9. A wind turbine apparatus as claimed in claim 7, wherein the sleeve has a first diameter and the pin has a second diameter which is smaller than the first diameter; wherein the openings of the first and second rails are sized to receive the first and second diameters respectively.

10. A wind turbine apparatus as claimed in claim 5, wherein the first and/or second rail is provided with a retention member having or defining a hole sized to receive the first or second terminal portion, wherein the retention member is configured to be aligned with the rail so that the terminal portion is received by the hole of the retention member and the opening in the rail and wherein the retention member is translatable relative to the rail so as to draw the terminal portion against the rail, thereby mechanically connecting the stator to the rail.

11. A wind turbine apparatus as claimed in claim 10, wherein the first and/or second rails are tubular defining a cavity which extends therethrough and wherein the retention member is received within the cavity.

12. A wind turbine apparatus as claimed in claim 11, wherein an exterior profile of the retention member is sized and/or shaped to ensure alignment of the hole of the retention member and the opening in the rail.

13. A wind turbine apparatus as claimed in claim 12, wherein the exterior profile of the retention member substantially corresponds to an interior profile of the cavity.

14. A wind turbine apparatus as claimed in claim 10, wherein the retention member is secured to the rail by a threaded fastener which translates the retention member relative to the rail as it is rotated.

15. A wind turbine apparatus as claimed in claim 5, wherein the blade portion and the generator form a turbine module and wherein the apparatus includes a plurality of said modules.

* * * * *